United States Patent
Sayyed et al.

(10) Patent No.: US 12,204,424 B2
(45) Date of Patent: Jan. 21, 2025

(54) PRIVACY AND SECURITY ASSURANCE DURING OPERATING SYSTEM CRASH EVENTS

(71) Applicant: Dell Products L.P., Round Rock, TX (US)

(72) Inventors: Ibrahim Sayyed, Georgetown, TX (US); Adolfo Montero, Pflugerville, TX (US); Daniel Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 17/940,787

(22) Filed: Sep. 8, 2022

(65) Prior Publication Data
US 2024/0086288 A1   Mar. 14, 2024

(51) Int. Cl.
G06F 11/00     (2006.01)
G06F 11/07     (2006.01)
G06F 11/22     (2006.01)

(52) U.S. Cl.
CPC ...... *G06F 11/2284* (2013.01); *G06F 11/0772* (2013.01); *G06F 11/0793* (2013.01)

(58) Field of Classification Search
CPC ............. G06F 11/1417; G06F 11/3058; G06F 11/0787; G06F 11/0766; G06F 11/0772; G06F 11/0751; G06F 11/3051; G06F 11/2284
See application file for complete search history.

(56) References Cited

U.S. PATENT DOCUMENTS

| | | | |
|---|---|---|---|
| 7,594,144 B2* | 9/2009 | Brandyberry | G06F 11/0787 714/34 |
| 2018/0336086 A1* | 11/2018 | Vaden | G06F 11/3089 |
| 2019/0057000 A1* | 2/2019 | Wszolek | G06F 11/0772 |
| 2021/0110016 A1 | 4/2021 | Kamepalli et al. | |
| 2021/0303739 A1 | 9/2021 | Gopal et al. | |

* cited by examiner

*Primary Examiner* — Charles Ehne
(74) *Attorney, Agent, or Firm* — Larson Newman, LLP

(57) ABSTRACT

An embedded controller locks down one or more devices within an information handling system based on a detection of an operating system crash. A processor monitors an operating system executing within the information handling system, and detects the operating system crash. In response to the detection of the operating system crash, the processor notifies the embedded controller of the operating system crash.

15 Claims, 4 Drawing Sheets

PRIVACY AND SECURITY ASSURANCE DURING OPERATING SYSTEM CRASH EVENTS

FIELD OF THE DISCLOSURE

The present disclosure generally relates to information handling systems, and more particularly relates to privacy and security assurance during operating system crash events.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an embedded controller and a processor. The embedded controller may lock down one or more devices within the information handling system based on a detection of an operating system crash. The processor may monitor an operating system executing within the information handling system, and detect the operating system crash. In response to the detection of the operating system crash, the processor may notify the embedded controller of the operating system crash.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
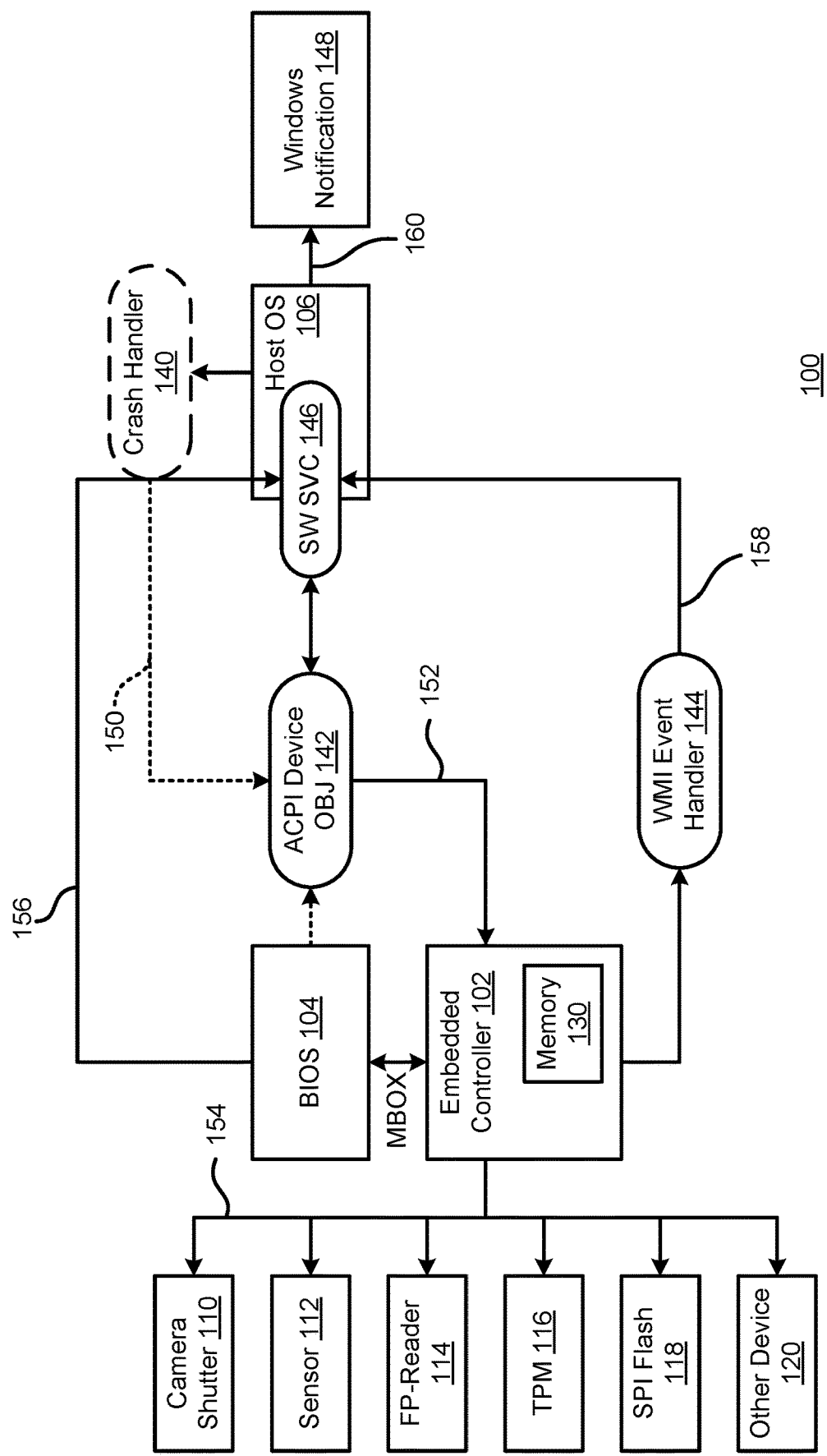
FIG. 1 is a diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes an embedded controller (EC) 102, a basic input/output system (BIOS) 104, and a host operating system (OS) 106. Information handling system 100 has a number of EC controlled devices including a camera shutter 110, a sensor 112, a finger print (FP)-reader 114, a trusted platform management (TPM) 116, a serial peripheral interface (SPI) flash memory 118, and other devices 120. EC 102 includes a memory 130. In an example memory 130 may be a protected non-volatile memory, such as a non-volatile random access memory (NVRAM). During operation of information handling system 100, EC 102, BIOS 104, and host OS 106 may utilize or execute any suitable drivers, services, or handlers, such as a crash handler 140, an advanced configuration and power interface (ACPI) device object 142, an event handler 144, an OS software service 146, and a windows notification 148, to perform operations described herein. Information handling system 100 may include additional components without varying from the scope of this disclosure.

During operation of information handling system 102, OS 106 may crash or otherwise stop operating (freeze-up). In response to an OS crash, previous information handling systems may encounter one or more problems due to the complexity of the software and hardware architecture of the information handling system being under heavy workloads. In previous information handling system, the OS crashing may result from one or both of hardware and software issues. Attackers may inject exploits, which in turn may cause intentional OS crashes. These exploits may target system peripheral interfaces over peripheral component interface express (PCIe), which may have decreased system immunity during crash events base on OS trust boundaries no longer being operational during the OS crash.

Information handling systems, such as portable computers, may include integrated privacy screens, which in turn may offer the protection to thwart visual information leaks. However, previous information handling systems may not include security for other devices during the OS crash. These devices may include local microcontroller unit (MCU) firmware that may interact with a host OS and other host MCUs. When the system crashes in previous information handling systems, all these devices may become more vulnerable to exploits/attacks. This vulnerability may create a back door path for attackers to steal sensitive information from devices holding private/sensitive data. The back door path may exist in previous information handling systems based on the OS not being aware if malware, such as a corrupted boot path or malware application, was installed when the OS crash occurred. When an OS crash happens, an information handling system stops operating normally, and peripherals and other devices attached to the information handling system remain in a quasi state until the host OS can take action to clear it and return to normal operating conditions.

Information handling system 100 may be improved by EC 102 locking down key resources that may be susceptible to malware/privacy attacks during crash events of OS 106 via a driver hooking into the correct blue screen of death (BSOD) interrupt vector. In this example, EC 102 utilizing a persistent kernel driver may ensure that the BSOD protection vector cannot be compromised in information handling system 100. In certain examples, information handling system 100 may be improved by EC 102, BIOS 104, and OS 106 may collaborate and coordinate to manage privacy sensitive devices, such as camera shutter 110, sensor 112, FP-reader 114, TPM 116, a SPI flash memory 118, and other devices 120, to protect these devices from malware upon learning about any host OS crash events. The improvement to information handling system 100 may include events below OS 106, such that they can be reported back to the host OS stack when the information handling system returns to a healthy state.

During operation of information handling system 100, OS 106 may perform any suitable operations and crash handler 140 may monitor the OS to determine or detect whether a crash has occurred. In response to detection of an OS crash, crash handler 140 may perform one or more suitable operations to communicate with EC 102 and set flags in the EC to indicate that an OS crash has occurred. For example, at operation 150, crash handler 140 may utilize ACPI device object 142 to pass or send data corresponding the OS crash to EC 103. In certain examples, the operations of OS 106 and crash handler 140 may be performed or executed by a processor, such as processor 402 of FIG. 4. In an example, at operation 152, ACPI device object 142 may utilize memory mapped I/O (MMIO) operations to flag bits in the MMIO of memory 130 to identify that an OS crash or incident occurred. In certain examples, ACPI device objection 142 may be a BIOS ACPI runtime object executable by crash handler 140 of OS 106.

Based on bits in the MMIO, EC 102 may learn about the crash of OS 106 and then retrieve a list of privacy/security sensitive devices managed by the EC, such as camera shutter 110, sensor 112, FP-reader 114, TPM 116, SPI flash memory 118, and other devices 120. EC 102 may utilize the list of privacy/security sensitive devices to clear the device states to lock down the various devices based on the detection of the crash of OS 106. At operation 154, EC 102 may clear the device states in any suitable manner including, but not limited to, place the devices into a safe/locked operating condition. In an example, the safe/locked operating condition may prevent malware from exfiltration any sensitive information or cause any errant behavior.

In certain examples, a safe/locked state may be a policy managed by EC 102 that has rules on what type of action needs to take place for each device in the policy table. For example, based on a policy for SPI flash memory 118, EC 102 may remove access permissions to the SPI flash memory such that data may not be stored or read from the SPI flash memory. In an example, EC 102 also may utilize the policy information to lock camera shutter 110 and FP-reader 114 by removing authentication information associated with the devices. In certain examples, EC 102 may utilize the policy information to lock, reset, or the like sensor 112, TPM 116, SPI flash memory 118, and other devices 120. The policies in EC 102 may control what devices as locked down, a priority list of an order that the devices are locked down, change the priority order, or the like. In an example, the priority list order may include first lock down FP-reader 114, then lock down TPM 116, next lock down SPI flash memory 118, and so on for all the devices. In an example, EC 102 may store the crash event as a runtime bare metal telemetry event in memory 130. In certain examples, the bare metal telemetry event may indicate which devices were locked/protected by EC 102.

During a next boot or reboot after a crash of host OS 106, BIOS 104 may provide ACPI tables to SW SVC driver 146 at operation 156. BIOS 104 may send a new POST query to EC 102. In an example, the POST query may be a request for any crash event data. In response to the POST query, EC 102 may prepare the bare metal telemetry event containing the EC managed privacy context information as an event to be delivered to SW SVC driver 146 within the OS layer. In an example, the communication between EC 102 and BIOS 104 may be any suitable type of communication, such as a mail box (MBOX) communication.

At operation 158, EC 102 may send the events to OS 106 as a WMI event via WMI event handler 144. In an example, the WMI event may be utilized as an event to provide a message to a user of information handling system. In response to the WMI event, SW SVC driver 146 may send a windows notification 148 at operation 160. In certain examples, windows notification 148 may be sent by SW SVC driver 146 a notification manager of OS 106, which in turn may notify the user of the actions that have been taken to protect the safety of the user's privacy/security sensitive devices. In an example, SW SVC driver 146 may enable EC 102 to communicate with OS 106 to identify a crash and identify devices that were shut down or locked down by the EC.

Figure 2:
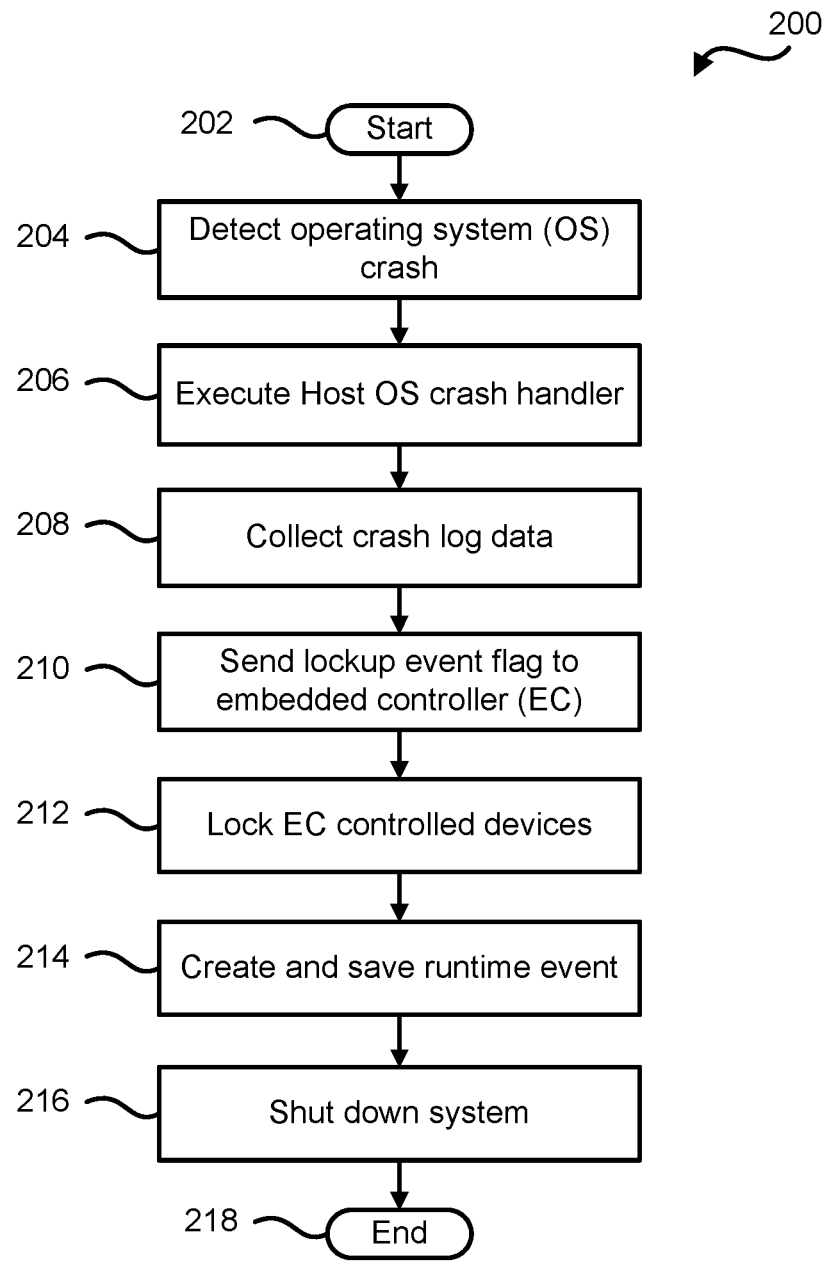
FIG. 2 is a flow diagram of a method for detecting an information handling system crash and providing device security in response to the crash according to at least one embodiment of the present disclosure.

FIG. 2 shows a method 200 for detecting an information handling system crash and providing device security in response to the crash according to at least one embodiment of the present disclosure, starting at block 202. In an example, the method 200 may be performed by any suitable component including, but not limited to, embedded controller 102, BIOS 104, and host OS 106 of FIG. 1. Not every method step set forth in this flow diagram is always necessary, and certain steps of the methods may be combined, performed simultaneously, in a different order, or perhaps omitted, without varying from the scope of the disclosure.

At block 204, an OS crash is detected. At block 206, a hot OS crash handler is executed. In an example, the crash handler may be executed by any suitable devices, such as processor 402 of information handling system 400 in FIG. 4. At block 208, crash log data is collected. In an example, the crash log data may include any suitable data, such as the type of crash. The type of crash may be a BSOD or any other CPU freeze.

At block 210, a lockup or freeze event flag is sent to an EC of the information handling system. In an example, the lockup or freeze may be provided by an ACPI device object may utilize MMIO operations to flag bits in the MMIO of a memory of the EC to identify that an OS crash or incident occurred. At block 212, the EC may lock down EC controlled devices within the information handling system. The EC controller devices may include, but are not limited to, a camera shutter, a sensor, a FP-reader, a TPM, and a SPI flash memory.

At block 214, a runtime event is created and saved. In an example, the runtime event may be a bare metal telemetry event and the runtime event may be stored in a memory of the EC. In certain examples, the bare metal telemetry event may indicate which devices were locked/protected by the EC. At block 216, the information handling system is shut down and the flow ends at block 218.

Figure 3:
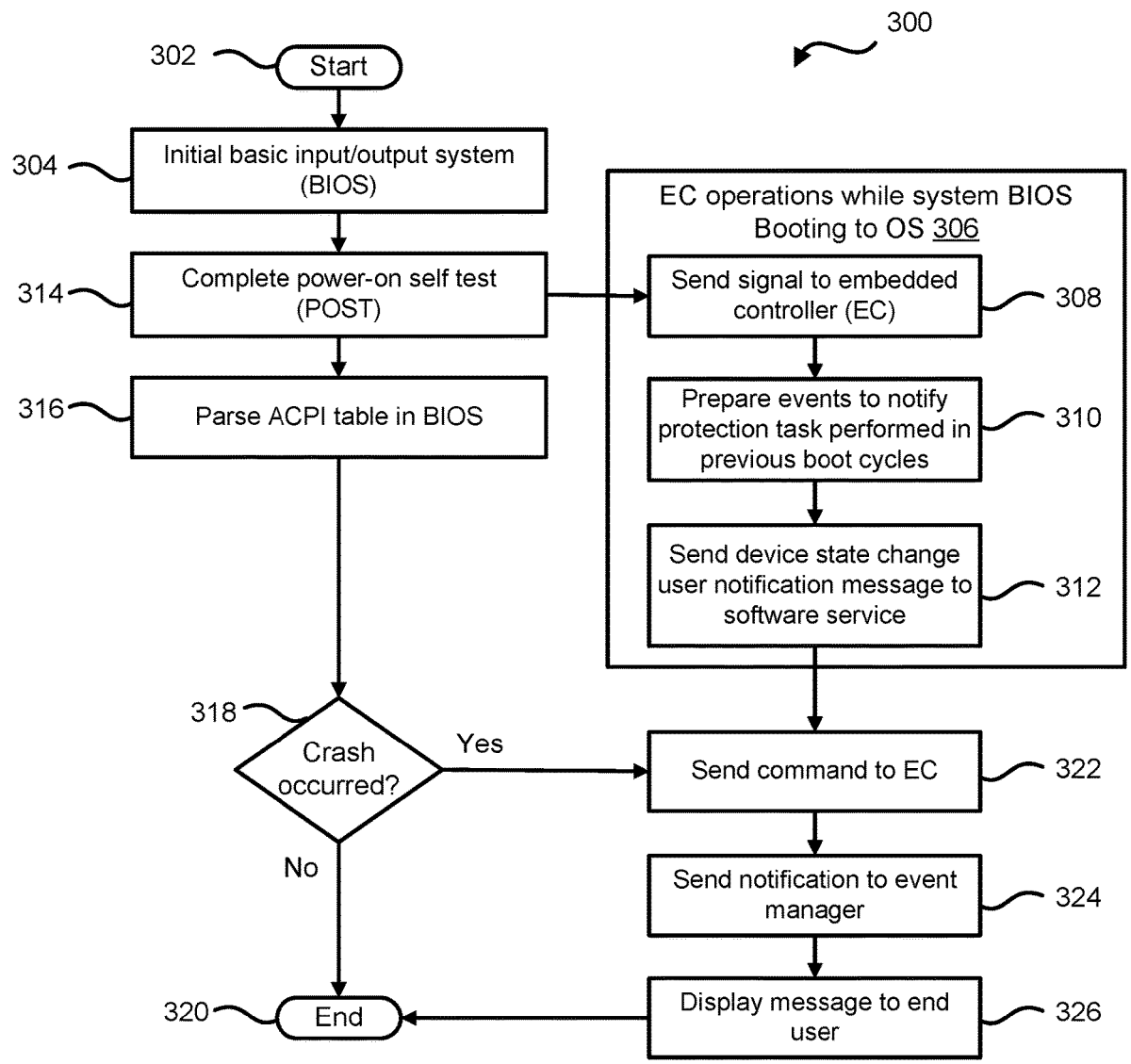
FIG. 3 is a flow diagram of a method for providing device security after an information handling system recovers from a crash according to at least one embodiment of the present disclosure.

FIG. 3 shows a method 300 for providing device security after an information handling system recovers from a crash according to at least one embodiment of the present disclosure, starting at block 302. In an example, the method 300 may be performed by any suitable component including embedded controller 102, BIOS 104, and host OS 106 of FIG. 1. Not every method step set forth in this flow diagram is always necessary, and that certain steps of the methods may be combined, performed simultaneously, in a different order, or perhaps omitted, without varying from the scope of the disclosure.

At block 304, a BIOS is initialized. In response to the BIOS being initialized, a number of EC operations may be executed in block 306 while the information handling system BIOS is booted to OS in block 314. Within block 306, the operations of blocks 308, 310, and 312 may be performed. At block 314, the power-on self test (POST) is completed. In an example, after the POST is completed, the BIOS may provide information associated with the crash incident through an ACPI table. In certain examples, the crash incident may be a BSOD incident. The BIOS may provide the ACPI table to the OS of the information handling system. At block 308, a signal is sent to the EC. At block 310, events are prepared. In an example, the events are utilized to notify the OS of protection tasks that were performed in previous boot cycles. At block 312, a device state change user notification message is sent to a software service. In an example, the device state change may indicate which devices the EC locked down after the OS crash was detected.

At block 316, an ACPI table in the BIOS is parsed. In an example, the ACPI table may indicate whether an OS crash occurred before a reboot of the information handling system. At block 318, a determination is made whether a crash occurred. If an OS crash did not occur, the flow ends at block 320. If an OS crashed occurred, a command is sent to the EC at block 322. At block 324, a notification is sent to an event manager. In an example, the notification may indicate the devices that were located down by the EC based on the detected OS crash. At block 326, the message is displayed to an end user, and the flow ends at block 320. In an example, the message includes the notification of the EC controlled devices that were locked down.

Figure 4:
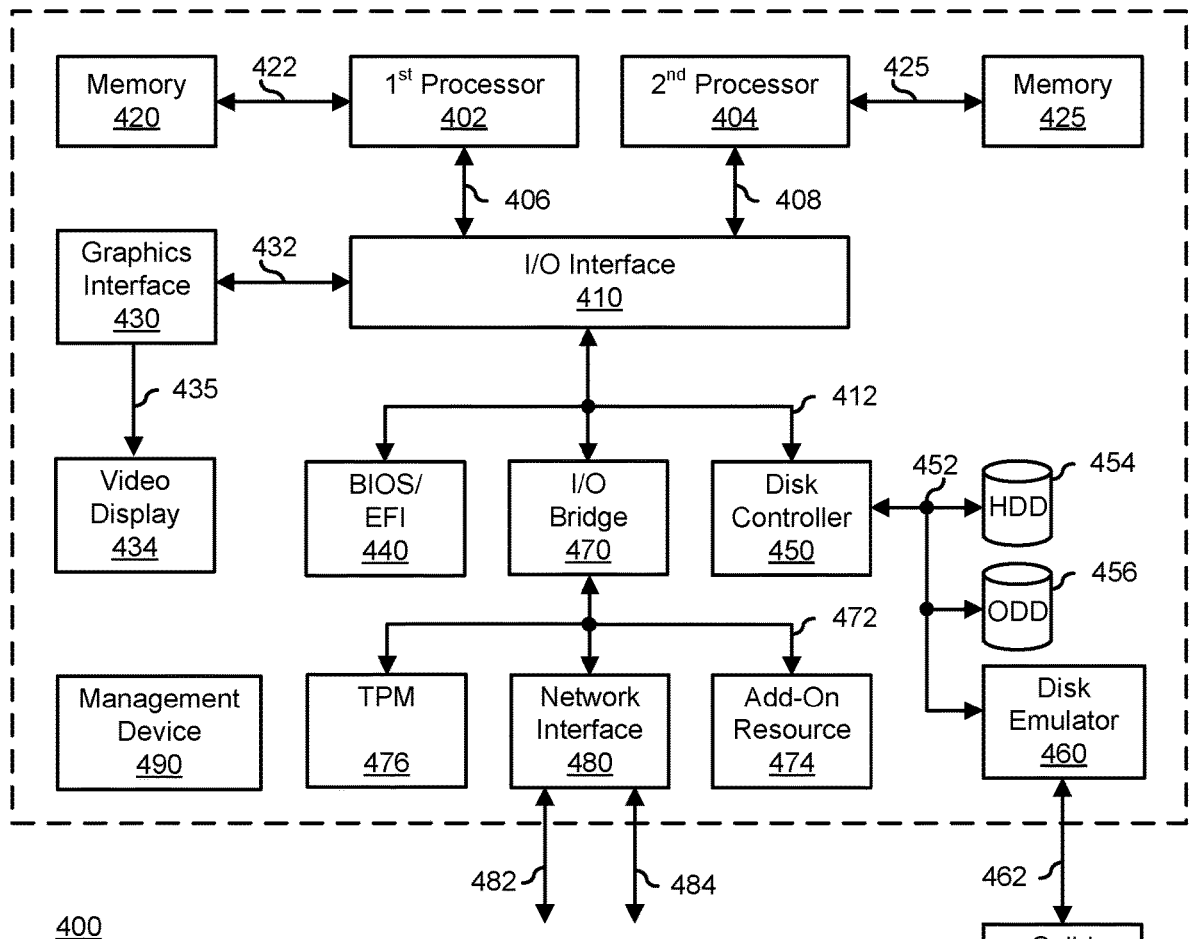
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   an embedded controller to lock down one or more devices within the information handling system based on a detection of an operating system crash;
   a processor to communicate with the embedded controller, the processor to:
      monitor an operating system executing within the information handling system;
      detect the operating system crash; and
      notify the embedded controller of the operating system crash, wherein a reboot of the information handling system is performed after the embedded controller locks down the devices; and
   a basic input/output system (BIOS), after the reboot of the information handling system, the BIOS to:
      provide an advanced configuration and power interface (ACPI) table to a host operating system of the information handling system, wherein the ACPI table identifies an incident that caused the operating system crash.

2. The information handling system of claim 1, wherein after the reboot of the information handling system, the embedded controller further to provide a event notification to a software service driver of the operating system, wherein the event notification includes a message indicating the devices locked down based on the detection of the operating system crash.

3. The information handling system of claim 2, wherein the software service driver provides the message to an end user of the information handling system.

4. The information handling system of claim 1, further comprising a basic input/output system (BIOS), the BIOS to:
   provide a power-on self-test (POST) query to the embedded controller, wherein the POST query is a request for crash event data; and
   receive bare metal telemetry event data from the embedded controller, wherein the bare metal telemetry event includes embedded controller managed privacy context information indicating the devices that were locked down.

5. The information handling system of claim 1, wherein the notification of the operating system crash includes the processor to set a flag in a memory mapped input/output (MMIO) of a memory in the embedded controller.

6. The information handling system of claim 5, wherein the processor executes a crash handler to set the flag in the MMIO.

7. A method comprising:
   monitoring, by a processor, an operating system executing within an information handling system;
   detecting, by the processor, a operating system crash;
   notifying, by the processor, an embedded controller of the operating system crash; and
   in response to the notification of the operating system crash, locking down, by the embedded controller, one or more devices within the information handling system; and
   based on the devices being locked down, rebooting the information handling system;
   after the rebooting of the information handling system:
      providing, by a basic input/output system (BIOS), an advanced configuration and power interface (ACPI) table to a host operating system of the information handling system, wherein the ACPI table identifies an incident that caused the operating system crash.

8. The method of claim 7, wherein after the rebooting of the information handling system, the method further comprises:
   providing, by the embedded controller, a event notification to a software service driver of the operating system, wherein the event notification includes a message indicating the devices locked down based on the detection of the operating system crash.

9. The method of claim 8, further comprising providing, by the software service driver, the message to an end user of the information handling system.

10. The method of claim 7, further comprising:
    providing, by a basic input/output system (BIOS), a power-on self-test (POST) query to the embedded controller, wherein the POST query is a request for crash event data; and
    receiving, by the BIOS, bare metal telemetry event data from the embedded controller, wherein the bare metal telemetry event includes embedded controller managed privacy context information indicating the devices that were locked down.

11. The method of claim 7, wherein the notifying of the operating system crash includes, the method further comprises setting, by the processor, a flag in a memory mapped input/output (MMIO) of a memory in the embedded controller.

12. The method of claim 7, further comprising executing, by the processor, a crash handler to set the flag in the MMIO.

13. A method comprising:
    monitoring, by a processor, an operating system executing within an information handling system;
    detecting, by the processor, a operating system crash;
    setting, by the processor, a flag in a memory mapped input/output (MMIO) of a memory in the embedded controller, wherein the setting of flag in the MMIO indicates the detection of the operating system crash;
    in response to the notification of the operating system crash, locking down, by the embedded controller, one or more devices within the information handling system;
    after the rebooting of the information handling system, providing, by the embedded controller, a event notification to a software service driver of the operating system, wherein the event notification includes a message indicating the devices locked down based on the detection of the operating system crash;
    providing, by a basic input/output system (BIOS), a power-on self-test (POST) query to the embedded controller, wherein the POST query is a request for crash event data; and
    receiving, by the BIOS, bare metal telemetry event data from the embedded controller, wherein the bare metal telemetry event includes embedded controller managed privacy context information indicating the devices that were locked down.

14. The method of claim 13, further comprising providing, by the software service driver, the message to an end user of the information handling system.

15. The method of claim 13, further comprising executing, by the processor, a crash handler to set the flag in the MMIO.

\* \* \* \* \*

UNITED STATES PATENT AND TRADEMARK OFFICE
CERTIFICATE OF CORRECTION

PATENT NO. : 12,204,424 B2
APPLICATION NO. : 17/940787
DATED : January 21, 2025
INVENTOR(S) : Ibrahim Sayyed et al.

Page 1 of 1

It is certified that error appears in the above-identified patent and that said Letters Patent is hereby corrected as shown below:

In the Claims

Column 10, Line 2: Please change "system crash; and" to --system crash;--

Signed and Sealed this
Eleventh Day of March, 2025

Coke Morgan Stewart
*Acting Director of the United States Patent and Trademark Office*